United States Patent [19]

Milani et al.

[11] Patent Number: 5,015,694

[45] Date of Patent: May 14, 1991

[54] POLYOLEFINIC COMPOSITIONS WITH A HIGH IMPACT STRENGTH

[75] Inventors: Federico Milani, Rovigo; Paola Massari; Domenico Lori, both of Ferrara, all of Italy

[73] Assignee: Montedison S.p.A., Italy

[21] Appl. No.: 587,260

[22] Filed: Sep. 24, 1990

[30] Foreign Application Priority Data

Sep. 26, 1989 [IT] Italy ................... 21831 A/89

[51] Int. Cl.$^5$ .............................................. C08L 23/16
[52] U.S. Cl. ................... 525/240; 525/211; 525/88; 525/89
[58] Field of Search ........................................ 525/240

[56] References Cited

U.S. PATENT DOCUMENTS 3,562,790  2/1971  Coover et al. ................ 525/240
4,412,016 10/1983  Fukui et al. .................... 525/89

FOREIGN PATENT DOCUMENTS 62-153334  7/1987  Japan .

Primary Examiner—Carman J. Seccuro

Attorney, Agent, or Firm—Bryan, Cave, McPheeters & McRoberts

[57] ABSTRACT

Polyolefinic compositions endowed with a high impact strength, comprising:

(a) 35–45% by weight of a $C_2/C_3$ copolymer containing from 4 to 10% by weight of $C_2$ and exhibiting a melt flow rate (M.F.R.) from 10 to 20 g/10 minutes at 230° C. and 2.16 kg;

(b) 35–45% by weight of a $C_2/C_3$ copolymer containing from 4 to 10% by weight of $C_2$ and exhibiting a M.F.R. from 35 to 45 g/10 minutes at 230° C. and 2.16 kg;

(c) 10–30% by weight of a $C_2/C_3/$(diene) elastomer containing from 40 to 55% by weight of $C_3$ and from 0 to 5% by weight of a diene monomer, which is amorphous to X-rays and is characterized by:

$\alpha_2 + \alpha_4$ higher than 16%
$R_1 \times R_2$ lower than 0.5
M.W.D. lower than 3
Mooney viscosity (ML 1+4, 100° C.) from 30 to 38
$|\eta|$ from 1.5 to 2 dl/g, measured in tetrahydronaphthalene at 135°.

4 Claims, No Drawings

POLYOLEFINIC COMPOSITIONS WITH A HIGH IMPACT STRENGTH

DESCRIPTION OF THE INVENTION

The present invention relates to polyolefinic compositions characterized by a high impact stregth, as well as by a high melt flow and a good moldability.

From Japanese patent application No. 57-159841 there are known polyolefinic compositions endowed with improved impact stregth characteristics and consisting of mixes of a crystalline ethylene-propylene block copolymer with an amorphous random ethylene-propylene copolymer and with talc.

Such compositions are affected by the drawback of having a too high viscosity and therefore an unsatisfactory moldability.

Furthermore, from Japanese patent application No. 62-153334 there are known polyolefinic compositions endowed with a high melt flow, consisting of mixes comprising, in suitable proportions, two crystalline ethylene-propylene block copolymers having M.I. of 45-65 and 10-35, respectively, and containing from 4 to 10% by weight of copolymerized ethylene, with two amorphous statistic ethylene-propylene copolymers containing 20-30% of propylene and exhibiting a Mooney viscosity ML 1+4 (100° C.) of 20-25 and 40-80, respectively.

The impact stregth of such compositions, however, is excessively low at low temperatures.

The Applicant has now found polyolefinic composition—which are the object of the present invention—endowed at the same time with a high melt flow and a high impact stregth at low temperatures.

Said compositions comprise:

(a) from 35 to 45% by weight of a propylene-ethylene copolymer, containing from 4 to 10% by weight of copolymerized ethylene, and exhibiting a melt flow rate (M.F.R.) ranging from 10 to 20 (g/10 minutes, at 230° C. and 2.16 kg);

(b) from 35 to 45% by weight of a propylene-ethylene copolymer, containing from 4 to 10% by weight of ethylene, exhibiting a melt flow rate (M.F.R.) ranging from 35 to 45 (g/10 minutes, ar 230° C. and 2.16 kg);

(c) from 10 to 30% by weight of an elastomeric copolymer or terpolymer composed of units deriving from ethylene, propylene and, optionally, a conjugated or non-conjugated diene, diene, containing from 40 to 55%, but preferably from 40 to 50% by weight of propylene and from 0 to 5% by weight of a diene, which is amorphous to X-rays, and furthermore characterized by:

values of the sum $\alpha_2 + \alpha_4$ higher than 16% (to N.M.R. analysis);

Mooney viscosity ML (1+4) at 100° C. ranging from 30 to 38;

molecular weight distribution (M.W.D.) lower than 3;

values of product $R_1 \times R_2$ lower than 0.5;

intrinsic viscosity (in tetraline at 135° C.) ranging from 1.5 to 2 dl/g.

All the copolymers specified at points (a), (b) and (c) are known; the method of preparing them is broadly described in literature.

In particular, parameters $\alpha_2$ and $\alpha_4$ represent, as is known, the fraction of methylene sequences having, respectively, two and four uninterrupted methylene groups between two consecutive methyl and methylene groups in the polymeric chain, with respect to the total of uninterrupted methylene sequences, determined by $^{13}C$ N.M.R. analysis. The value of such fraction is determined by means of the method described by J. C. Randall in "Macromolecules" 11, 33 (1978).

Parameters $R_1$ and $R_2$ represent the reactivity ratio values of the monomers—ethylene and propylene—on which the distribution of the corresponding monomeric units in the copolymer is depending. For values of product $R_1 \times R_2$ equal to 1, the distribution of the monomeric units is fully at random.

For values of such ratio higher than 1, the formation of relatively long chain stretches containing a same monomeric unit is, conversely, favoured. For values lower than 1, the alternation of the two monomers is favoured and, the composition being equal, the sequences containing a same monomeric unit become shorter and shorter.

Details in this connection and the method for determining the values of product $R_1 \times R_2$ are illustrated by G. Natta et al. in "La Chimica e l'Industria" vol. 42—No. 2, Feb. 1960, pages 125-132, as well as by C. Tosi et al. in "European Polymer Journal" 1968, vol. 4, pages 107-114.

The molecular weight distribution (M.W.D.) is defined herein as the ratio between weight average molecular weight value and number average molecular weight value and it provides an indication about the polydispersion of the molecular masses.

As diene monomers which can participate in forming the elastomeric copolymers and terpolymers specified under the above point c), the following ones are to be mentioned as an example: ethylidene norbornene, indene, 1,4-hexadiene 1,3-butadiene, cyclopentadiene, norbornadiene.

Preferred concentrations of elastomeric component (c) in the compositions of the invention are in the range of from 15 to 30% by weight, and even more preferably from 15 to 25% by weight.

Inorganic or organic, also polymeric fillers, besides dyes and stabilizers, can be present in the compositions according to the invention preferably up to about 10% by weight referred to the total weight of the composition.

The compositions forming the object of the present invention are preparable by mixing the three components in a Banbury type mixer at a polymeric material melting temperature generally ranging from 180° to 190° C., approximately.

The mix is then extruded and granulated. The granulated product is then utilizable to produce articles by injection molding.

The following examples are given to illustrate the present invention, but they should not be construed as to be a limitation thereof.

EXAMPLES 1-9 (OF COMPOSITIONS)

Operating at a temperature from 180° to 190° C. in a Banbury mixer of 13 l volume, nine mixes were prepared, which were then extruded in an operating single-screw extruder.

The resulting extrudate was utilized to produce, by injection molding, test pieces having dimensions in accordance with ASTM standards, on which the following was determined:

(a) M.F.R. value (ASTM D.1238)

(b) elastic flexural modulus (ASTM D.790)

(c) Izod resilience (ASTM D.256)
(d) heat distortion temperature (HDT) (ASTM D.648)
(e) VICAT softening point (ASTM D.1505)
(f) tensile stregth (ASTM D.638)
(g) elongation at break (ASTM D.638).

The mixes so prepared had the following weight composition:

MIX (1)

A. 45% of a copolymer of propylene with 5% by weight of ethylene, having a M.F.R.=13;
B. 45% of a copolymer of propylene with 5% by weight of ethylene, having a M.F.R.=40;
C. 10% of an amorphous elastomeric ethylene-propylene copolymer containing 45% by weight of propylene, having a $|\eta|=1.6$, a Mooney viscosity=34, values of $\alpha_2+\alpha_4=18\%$, $R_1 \times R_2=0.3$, and a M.W.D.=2.8.

MIX (2)

A. 40% of copolymer A of mix (1);
B. 40% of copolymer B of mix (1);
C. 20% of copolymer C of mix (1).

MIX (3)

A. 35% of copolymer A of mix (1);
B. 35% of copolymer B of mix (1);
C. 30% of copolymer C of mix (1).

MIX (4)

A. 42.5% of copolymer A of mix (1)
B. 42.5% of copolymer B of mix (1)
C. 15% of copolymer C of mix (1)

MIX (5)

A. 37.5% of copolymer A of mix (1)
B. 37.5% of copolymer B of mix (1)
C. 25% of copolymer C of mix (1)

MIX (6) (COMPARATIVE)

A. 45% of copolymer A of mix (1)
B. 45% of copolymer B of mix (1);
C. 10% of an amorphous elastomeric ethylene-propylene copolymer containing 43% by weight of propylene, having a Mooney viscosity at 100° C. higher than 50, a $|\eta|=2$, a value of $\alpha_2+\alpha_4=15\%$, $R_1 \times R_2=0.4$, a M.W.D.=2.9.

MIX (7) (COMPARATIVE)

A. 40% of copolymer A of mix (1);
B. 40% of copolymer B of mix (1);
C. 20% of copolymer C of mix (6).

MIX (8) (COMPARATIVE)

A. 35% of copolymer A of mix (1);
B. 35% of copolymer B of mix (1);
C. 30% of copolymer C of mix (6).

MIX 9 (COMPARATIVE)

A. 40% of copolymer A of mix (1);
B. 40% of copolymer B of mix (1);
C. 20% of an amorphous elastomeric ethylene-propylene copolymer containing 44% by weight of propylene, having a Mooney viscosity at 100° C. equal to 35, $|\eta|=2.0$, a value of $\alpha_2+\alpha_4=0.2\%$, $R_1 \times R_2=1$, M.W.D.=6.

The characteristics of the compositions are indicated in the Table.

TABLE

| | | MIXES | | | | | | | | |
|---|---|---|---|---|---|---|---|---|---|---|
| | | 1 | 2 | 3 | 4 | 5 | 6 | 7 | 8 | 9 |
| Elastic flexural modulus | (MPa) | 1200 | 1000 | 750 | 1100 | 970 | 1100 | 900 | 650 | 1000 |
| M.F.R. | | 16 | 13 | 10 | 15 | 12 | 13 | 9 | 5 | 11 |
| Izod resilience | | | | | | | | | | |
| at 23° C. | (J/m) | 97 | 500 | 650 | 250 | 600 | 42 | 100 | 500 | 150 |
| at 0° C. | (J/m) | 58 | 350 | 600 | 200 | 500 | 28 | 50 | 100 | 90 |
| at −20° C. | (J/m) | 55 | 100 | 600 | 75 | 300 | 26 | 40 | 80 | 70 |
| at −40° C. | (J/m) | 45 | 90 | 500 | 65 | 250 | 25 | 35 | 70 | 60 |
| VICAT | (°C.) | 143 | 133 | 118 | 140 | 126 | — | — | — | — |
| HDT at 0° C. | (°C.) | 85 | 74 | 69 | 80 | 72 | — | — | — | — |
| Tensile strength | (MPa) | 18.8 | 23.4 | 19.3 | 22,2 | 22,5 | 18.5 | 15.3 | 12.7 | — |
| Elongation at break | (%) | 600 | 670 | 600 | 600 | 650 | 40 | 60 | 80 | — |

We claim:

1. Polyolefinic compositions comprising
   (a) from 35 to 45% by weight of a propylene-ethylene copolymer, containing from 4 to 10% by weight of copolymerized ethylene, and exhibiting a melt flow rate (M.F.R.) ranging from 10 to 20 (g/10 minutes, at 230° C. and 2.16 kg);
   (b) from 35 to 45% by weight of a propylene-ethylene copolymer, containing from 4 to 10% by weight of ethylene, exhibiting a melt flow rate (M.F.R.) ranging from 35 to 45 (g/10 minutes, ar 230° C. and 2.16 kg);
   (c) from 10 to 30% by weight of an elastomeric copolymer or terpolymer composed of units deriving from ethylene, propylene and, optionally, a conjugated or non-conjugated diene, containing from 40 to 55% by weight of propylene and from 0 to 5% by weight of a diene which is amorphous to X-rays, and furthermore characterized by:

values of the sum $\alpha_2+\alpha_4$ higher than 16%;
   Mooney viscosity ML (1+4) at 100° C. ranging from 30 to 38;
   molecular weight distribution (M.W.D.) lower than 3;
   values of product $R_1 \times R_2$ lower than 0.5;
   intrinsic viscosity (in tetraline at 135° C.) ranging from 1.5 to 2 dl/g.

2. The compositions according to claim 1, wherein elastomeric copolymer (C) contains from 40 to 50% by weight of propylene.

3. The compositions according to claim 1, wherein elastomeric copolymer (C) is present at concentrations ranging from 15 to 30% by weight.

4. The compositions according to claim 1, wherein elastomeric copolymer (C) is present at concentrations ranging from 15 to 25% by weight.

* * * * *

UNITED STATES PATENT AND TRADEMARK OFFICE
CERTIFICATE OF CORRECTION

PATENT NO. : 5,015,694
DATED : May 14, 1991
INVENTOR(S) : FEDERICO MILANI et al.

It is certified that error appears in the above-identified patent and that said Letters Patent is hereby corrected as shown below:

Column 1, line 11: Change "stregth" to --strength--.

Column 1, Lines 31-32: Change "composition" to --compositions--.

Column 1, line 34: Change "stregth" to --strength--.

Column 1, line 44: Change "ar" to --at--.

Column 1, line 48: Delete the second occurrence of "diene,".

Column 2, line 32: Change "c)" to --(c)--.

Column 4, line 41: Change "ar" to --at--.

Signed and Sealed this

Twenty-seventh Day of September, 1994

Attest:

BRUCE LEHMAN

*Attesting Officer*   *Commissioner of Patents and Trademarks*